United States Patent [19]

Mann, Jr. et al.

[11] 4,098,397

[45] Jul. 4, 1978

[54] MULTI CHAMBERED THERMAL CONTAINER

[76] Inventors: William Mann, Jr.; Willa L. Mann, both of Box A 901 3636-16th St. NW., Washington, D.C. 20010

[21] Appl. No.: 558,928

[22] Filed: Mar. 17, 1975

[51] Int. Cl.² .................... B65D 81/38; B65D 25/04
[52] U.S. Cl. .......................... 206/217; 215/6; 215/13 R; 220/450; 220/465
[58] Field of Search ............ 220/16, 17, 20, 22, 220/9 C; 215/6, 13 R, DIG. 7; 206/217

[56] References Cited

U.S. PATENT DOCUMENTS

| | | | |
|---|---|---|---|
| 1,289,218 | 12/1918 | Maiden | 215/6 |
| 2,746,634 | 5/1956 | Smith | 220/16 |
| 3,107,498 | 10/1963 | Messer | 220/9 C X |
| 3,416,693 | 12/1968 | Lovington et al. | 220/9 C |
| 3,459,295 | 8/1969 | Cousar | 215/6 X |
| 3,465,905 | 9/1969 | Schottanes | 215/6 |
| 3,705,661 | 12/1972 | Davis | 215/6 |

FOREIGN PATENT DOCUMENTS 882,420  3/1941  France ................. 215/6

Primary Examiner—William Price
Assistant Examiner—Stephen Marcus
Attorney, Agent, or Firm—Lawrence Peska Associates, Inc.

[57] ABSTRACT

A multi chambered thermal container adapted to receive and maintain a plurality of liquids at various temperatures. The container comprises an outer casing formed from layers of aluminum, insulation, and plastic. Two semi annular chambers as well as a cylinder shaped chamber are contained within the container. A compartment is provided for the storage of drinking glasses.

3 Claims, 5 Drawing Figures

MULTI CHAMBERED THERMAL CONTAINER

SUMMARY OF THE INVENTION

Our invention relates to a unique and novel improvement in a multi chambered thermal container.

It is known from U.S. Pat. Nos.: 2,963,188; 3,245,565; and 3,705,661 that two compartment thermal containers have been employed, but these aforementioned patents fail to provide more than two compartments. U.S. Pat. No. 3,469,739 provides a paper cup dispenser in a carafe; however, this patent does not provide for the internal storage of the drinking glasses.

It is an object of our present invention to provide a multi chambered thermal container, wherein the various chambers are thermally insulated from one another.

Another object of our present invention is to provide a storage compartment for drinking glasses within the multi chambered thermal container. A further object of my invention is to provide a means of insulating between the various compartments.

Briefly, our present invention comprises a multi chambered thermal container 10 adapted to receive and maintain a plurality of liquids at various temperatures. The container comprises an outer casing formed from layers of aluminum, insulation and plastic sandwiched together. Two semi annular chambers as well as a cylinder shaped chamber are contained within the container. A compartment is provided for the storage of drinking glasses.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
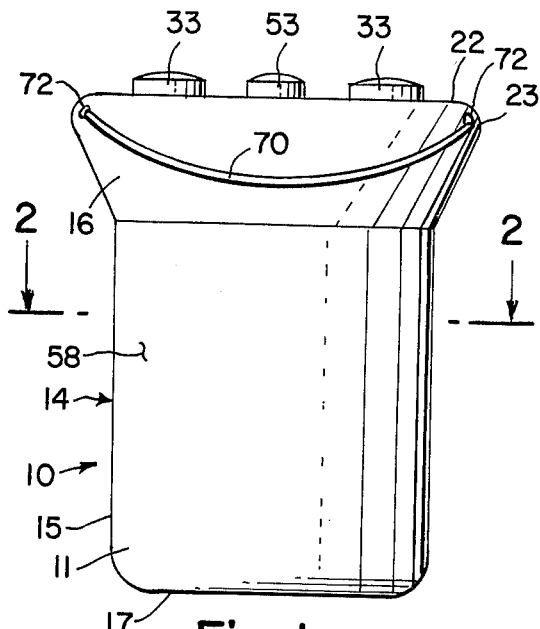
FIG. 1 illustrates a front elevated view of the container.
Figure 2:
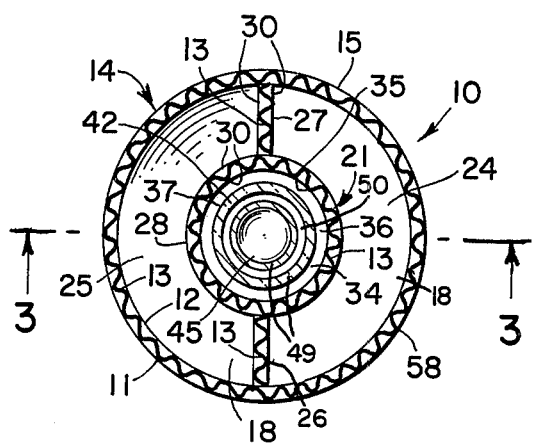
FIG. 2 illustrates a sectional view taken along line 2—2 of FIG. 1.
Figure 3:
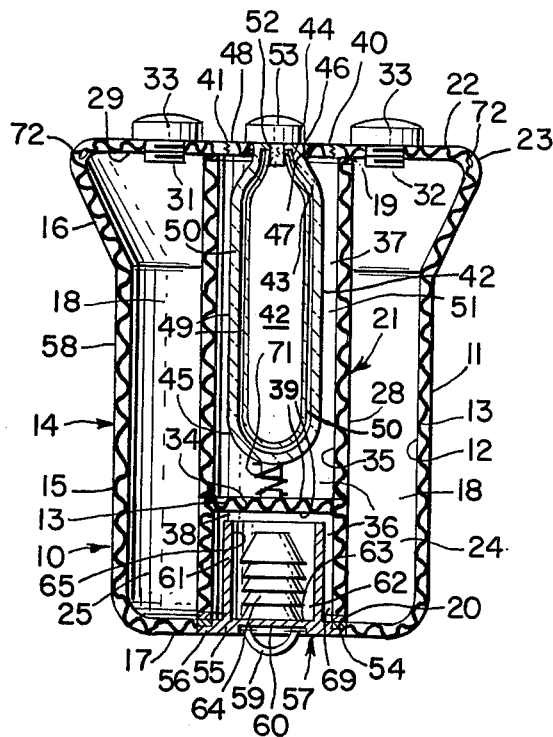
FIG. 3 illustrates a cross sectional view in elevation of the three chambered container.
Figure 5:
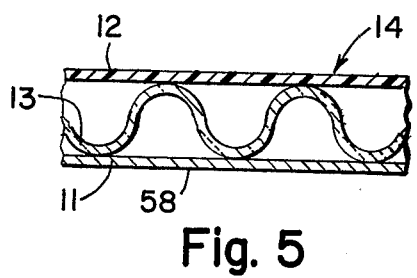
FIG. 5 illustrates an enlarged cross sectional view of the outer casing of the container.

Turning now descriptively to the drawings, in which similar reference characters denote similar elements throughout the several views, FIGS. 1-3 show a multi chambered thermal container adapted to receive and maintain a plurality of liquids at various temperatures. The container 10 comprises an outer casing 14 having a cylinder shaped lower portion 15 and a divergent frustum shaped upper portion 16. A flat lateral bottom base 17 is affixed to the lower portion 15 of the casing 14 and a laterally placed annular member 22 is affixed to the upper end of the upper portion 16 of the casing 14. The casing as shown in FIG. 5 is formed from a laminate structure of an outer aluminum wall 11 and an interior plastic wall 12 having an internal fiberglass layer 13 disposed between walls 11, 12. A thermoplastic coating 58 is deposited onto the outer surface of wall 11. Referring back to FIGS. 2, 3 an open ended vertically placed cylinder shaped sleeve 21 is affixed by a first steel ring 19 to member 22 as well as to the top surface of base 17 of casing 14 by a second steel ring 20. An annular shaped chamber 18 exists between sleeve 21 and casing 14, wherein chamber 18 is divided into a right 24 and left 25 chamber by a first 26 and second 27 vertically placed divider affixed in a trans position to the longitudinal sidewall 28 of sleeve 21 as well as to the casing, 14 the top surface of base 17 and the bottom surface 29 of member 22. The dividers 26, 27 as well as sleeve 21 are formed from a double layer of plastic 30 having insulation 13 disposed between the layers 30. Two female threaded apertures 31, 32 are contained within member 22, wherein a first aperture 31 communicates with left chamber 25 and a second aperture 32 communicates with the right chamber 24. A male threaded plastic cap 33 threadably engages the apertures 31, 32. A circular horizontally placed disc 34 is affixed to a longitudinal inside periphery 35 of sleeve 21 dividing the interior chamber 36 of sleeve 21 into a large upper chamber 37 and a small lower chamber 38. The circular disc 34 is formed from two layers 39 of aluminum having a layer of insulation 13 disposed between the layers 39. Female threads 40 are contained on the inside periphery of member 22. A second circular disc 48 having male threads 41 on its outside periphery threadably engages the female threads 40 of member 22. A cylinder shaped vessel 42 having a convergent top end portion 43, an open top 44, and a rounded closed bottom 45 inserts upward into a rubber ring 46 contained in a center circular aperture 47 in disc 48. The vessel 42 extending vertically downward into upper chamber 37. The vessel 42 is formed from a double layer of glass 49 having a vacuum 50 between the layers of glass 49. An air space 51 exists between vessel 42 and sleeve 21. The round bottom 42 of vessel 42 rest on top of a vertical coil spring 71 mounted on top of disc 34. A cork 52 with a top plastic cap 52 inserts downward into the open top 44 of vessel 42. Vessel 42 as well as right 24 and left 25 chambers hold 69 different liquids at various temperatures. A circular hole in lateral bottom base 17 aligns with small lower chamber 38. An annular shaped magnet 54 is affixed to the base of sleeve 21. An aluminum disc 55 having an outer annular steel flange 56 forms the bottom base 57 of lower chamber 38 by the magnetic attraction between the steel flange 56 and the annular shaped magnet 54. An O-shaped ring handle 59 is swivelably mounted in a bottom surface recessed aperture 60 in bottom base 27, wherein ring 59 can be folded upward into aperture 60. An inverted open top cylinder 61 engages an annular aperture 62 in the top surface 63 of the bottom base 57. Drinking glasses 64 are stored in the interior cavity 65 of cylinder 61.

Figure 4:
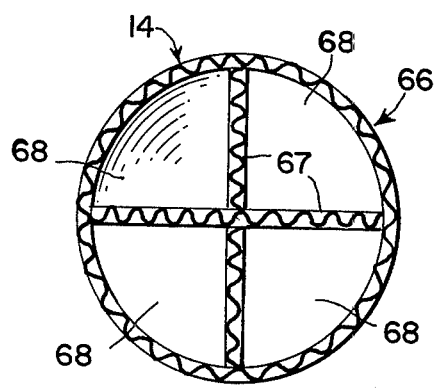
FIG. 4 illustrates a cross sectional view of a four chambered container.

FIG. 4 shows a four chambered thermal container 66, wherein an X shaped divider assembly 67 is vertically placed within the outer casing 14 to form four quarter chambers 68 for the storage of liquids.

Referring back to FIG. 1 a plastic handle 70 is swivelably mounted at two points 71, 72 to the frustum portion 16 of the outer casing 14 of the container 10.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A multi chambered thermal container, which comprises:
    (a) an outer casing having a cylindrically shaped lower portion, a flat lateral base, a frustum shaped upper portion, and a horizontally placed annular member affixed to a top inside periphery of said frustum shaped upper portion;
    (b) an open ended vertically placed cylinder sleeve affixed between said flat lateral bottom base and said horizontally placed annular member, said open ended sleeve having an interior chamber therein;
    (c) a first and a second vertically placed divider affixed in a trans alignment to a longitudinal sidewall of said open ended sleeve and an interior periphery of said outer casing forming a right and a left semi-annular chamber therein;
    (d) two female threaded apertures contained within said annular member and communicating with said left and said right semi-annular chambers;
    (e) a male threaded cap threadably engaging each said female threaded aperture;
    (f) said outer casing having an outer aluminum wall with a plastic coating and an interior plastic wall;
    (g) an internal fiberglass layer disposed between said interior plastic wall and said outer aluminum wall;
    (h) female threads contained on an inside periphery of said annular member;
    (i) a horizontally placed disc contained in said interior chamber dividing said interior chamber into a large upper chamber and a small bottom chamber;
    (j) a second circular disc having male threads on the outside periphery of said second circular disc, said second circular disc threadably engaging said female threads of said annular member, said second circular disc having a center circular aperture therein;
    (k) a rubber ring affixed in said center circular aperture;
    (l) a cylindrically shaped vessel having a convergent top end portion, an open top, and a rounded closed bottom, said convergent top end portion anchored within said rubber ring, said cylindrically shaped vessel contained within said large upper chamber; and
    (m) a cork having a plastic top positioned in said open top of said cylindrically shaped vessel.

2. A multi chambered thermal container, as recited in claim 1, wherein said first and said second vertically placed dividers and said open ended vertically placed cylinder sleeve comprises:
    (a) a double layer of plastic; and
    (b) said insulation layer disposed between said plastic layers.

3. A multi chambered thermal vessel as recited in claim 1, which further comprises:
    (a) annular shaped magnet affixed to a base of said open ended cylinder shaped cylinder;
    (b) said flat lateral bottom base having a circular hole aligning with said small lower chamber;
    (c) an aluminum disc having an outer annular steel flange;
    (d) aluminum disc forming a bottom base of small lower chamber by magnetic attraction between said annular steel flange and said annular shaped magnet;
    (e) said aluminum disc having a swivelably mounted handle; and
    (f) a plurality of stacked drinking glasses contained within said small lower chamber.

* * * * *